Patented Jan. 8, 1952

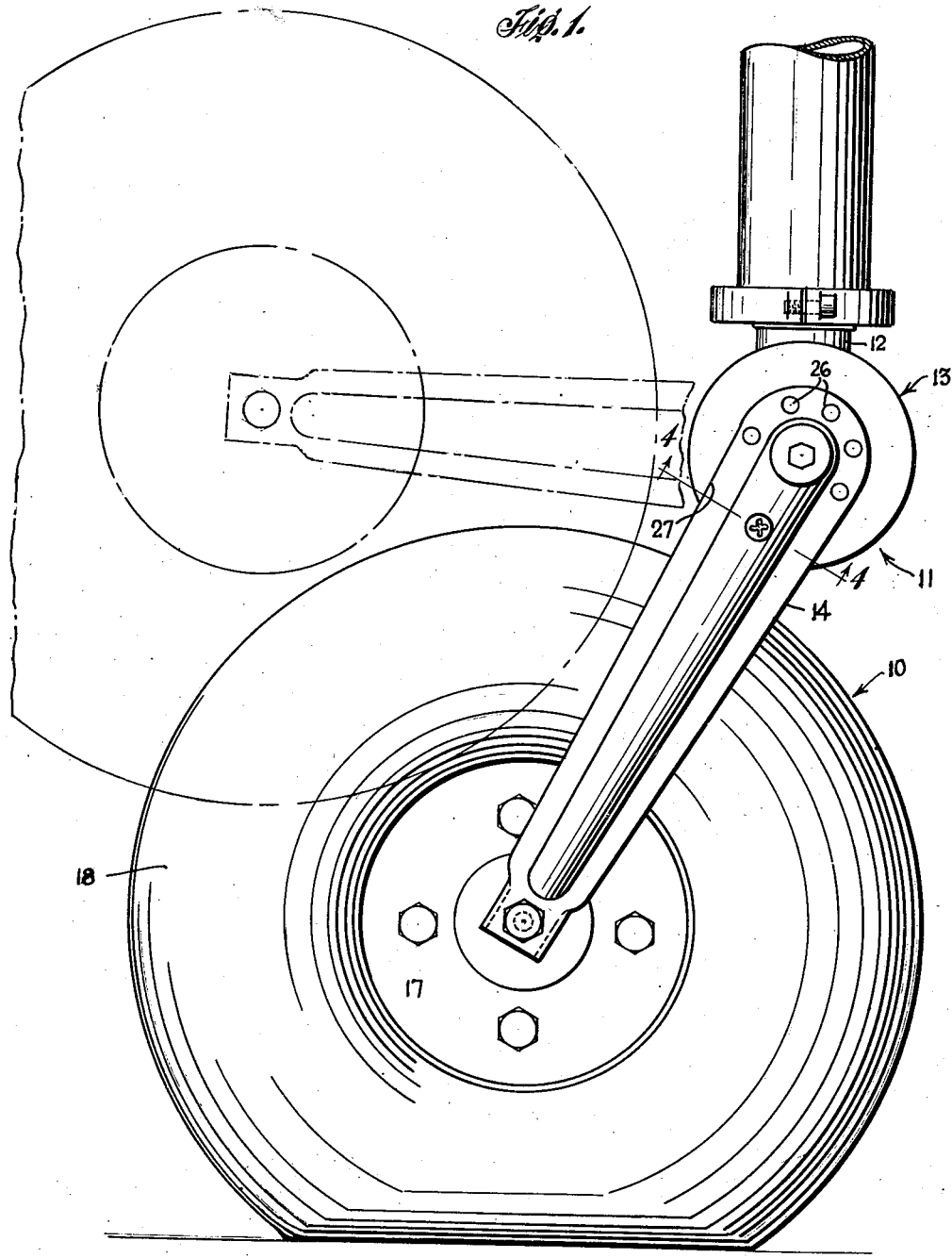

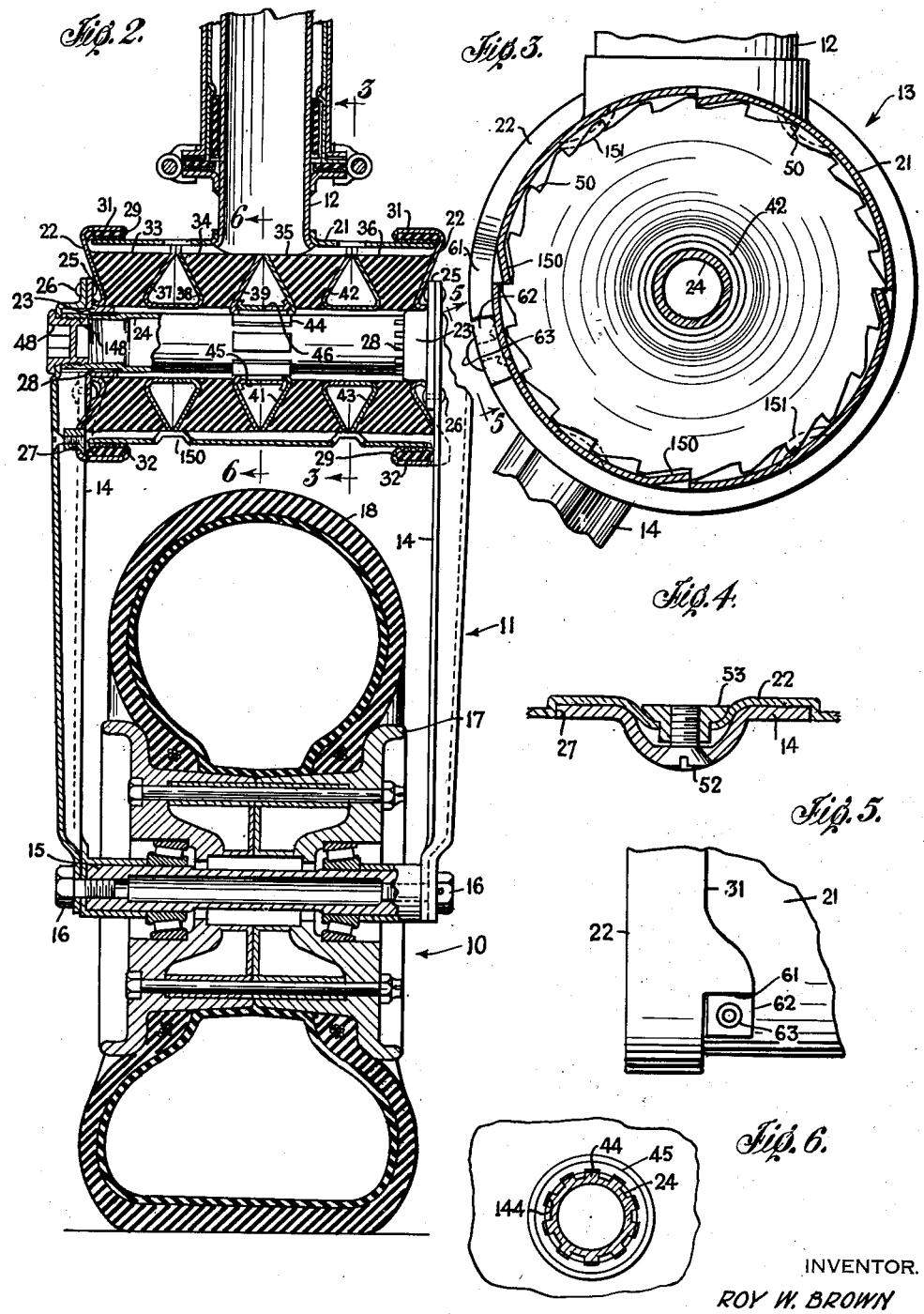

2,581,912

UNITED STATES PATENT OFFICE 2,581,912

TORSIONAL SUPPORT

Roy W. Brown, Akron, Ohio, assignor to The Firestone Tire & Rubber Company, Akron, Ohio, a corporation of Ohio Application May 16, 1947, Serial No. 748,599

12 Claims. (Cl. 267—21)

This invention relates to support means, especially to aircraft undercarriages wherein the aircraft is supported by a torsional force in the undercarriage.

Heretofore various types of aircraft supports and undercarriages have been suggested but none has been entirely satisfactory for one or more of many reasons. Aircraft undercarriages are not only subjected to a sudden, severe load on impact of the plane on the ground, or due to uneven ground conditions when taxiing the airplane, but also must carry their normal static load in a resilient manner. Hence, an aircraft undercarriage, or support, must be sturdy and deflection resistant, but still be lightweight, since all aircraft parts naturally must be held to minimum weight.

The general object of the present invention is to avoid and overcome the disadvantages of prior types of aircraft undercarriages and to provide an aircraft undercarriage which is adapted to carry load resiliently by a torsion member.

Another object of the invention is to provide an aircraft undercarriage which is adapted to function for extended periods with a minimum of maintenance.

Another object of the invention is to provide a compact, effective, reliable, adjustable support unit.

A further object of the invention is to provide an aircraft undercarriage using elastomers as load support means which can be prestressed both torsionally and compressively.

Yet another object of the invention is to provide a prestressed aircraft support unit which may be adjusted to any desired no load stress so as to adapt the support unit for support of any of a variety of airplanes, and to give any one aircraft a support of the desired stiffness.

The foregoing and other advantages of the invention will be made apparent as the specification proceeds.

Reference now is made to the accompanying drawings wherein:

Fig. 1 is a side elevation of an aircraft undercarriage embodying the principles of the invention;

Fig. 2 is a vertical section of the undercarriage unit shown in Fig. 1;

Fig. 3 is an enlarged section on line 3—3 of Fig. 2;

Fig. 4 is a fragmentary section on line 4—4 of Fig. 1;

Fig. 5 is a fragmentary plan on line 5—5 of Fig. 3; and

Fig. 6 is a fragmentary enlarged section on line 6—6 of Fig. 2.

Now referring in detail to the structure in the accompanying drawings, an aircraft undercarriage generally indicated by the numeral 11 is shown, which undercarriage 11 positions conventional supports means such as a pneumatic tire and wheel assembly 10 that is the ground contact for the undercarriage. The aircraft undercarriage 11 includes a cylindrical support member 12 that is secured to a torsion unit 13 which positions a pair of suspension arms 14 that in turn mount the pneumatic tire and wheel assembly 10 in any conventional manner as by an axle 15 secured between the free ends of the suspension arms 14 by cap screws 16 engaged with threaded end sctions formed in the bore of the axle 15. A wheel 17 is journalled on the axle 15 and a tire 18 is carried on such wheel.

The torsion unit 13 is provided with two relatively movable portions which are secured together through resilient means whereby the two relatively movable members can be displaced with relation to each other under load but which will automatically return themselves to a predetermined neutral position when an external load placed thereon is removed. A tubular housing 21 is provided which is adapted to engage with and mount the support 12 in any desired manner. The housing 21 is provided with end caps 22 that are secured to flanges 23 which are mounted on an axle 24 adjacent the ends thereof. The flanges 23, while of annular shape, have radially outwardly extending portions 25 secured to the end portions of the suspension beams 14 by a plurality of circumferentially spaced rivets 26 so that the flanges and suspension beams turn or rotate as a unit. Preferably a radially extending recess 27 of radius length is formed in each of the end caps 22 for receipt of the suspension arms 14 for interlocking engagement of the end caps 22 with the units formed of the flanges 23 and suspension arms 14. In order to engage the flanges 23 with the axle 24 on which they are carried suitable splines 28 are formed on the end portions of the axle and the radially inner surfaces of the flanges 23 are correspondingly serrated so as to engage with such splines 28.

So as to aid in resisting relative arcuate movement between the end caps 22 and housing 21, a layer of fabric base, friction material 29 is secured to a substantially tubular, axially inwardly extending flange section 31 formed on each end cap 22. This inwardly turned section 31 encompasses the housing 21 adjacent its ends with the friction material 29 being pressed against the housing. A sheet of rubber 32 or other desired means can be used to secure the friction material 29 to the section 31. Preferably, the material 29 is of the type which has greater kinetic friction than static friction, which unusual property is secured by impregnating the material 29 with a thixotropic lubricating composition including castor oil, a wax compatible with the oil and an aluminum soap dispersed in the composition. Graphite also may be present in the friction material impregnating composition. As a further function, the friction material 29 and rubber 32 serve as compression bearings for static load transmittal from the wheel support beams to the housing. For this purpose, other bearing materials may be substituted for the material 29, if desired.

The kinetic load absorbing members of the invention illustrated herein comprise a plurality of separate torsion units each of which is formed from an annular member which has metal facing discs secured to the opposed lateral face portions thereof. These torsion units are of the general type shown in MacBeth British Patent 419,291 and U. S. 2,080,969. A plurality of rubber rings 33, 34, 35, and 36, all of which are wedge-shape in radial section with the wider portion of the ring being at the radially outer edge of the ring where maximum torsion load is carried, are each secured between pairs of frusto-conical metal face plates, with the end caps 22 being secured to the axially outer surfaces of the rings 33 and 36, and functioning as face plates therefor. Metal face discs or plates 37, 38, 39, 41, 42, and 43, having axially extending foot sections, are secured to the remaining lateral faces of the rubber rings 33 through 36, as best shown in Fig. 2. The innermost plates 39 and 41 are secured to the axle 24 in any conventional manner which is shown herein as comprising axially directed projecting splines or ribs 44 formed on the tube 24 and engaging with complemental recesses or slots 144 formed in the radially inner or foot portions of the plates 39 and 41 as shown in Fig. 6.

Preferably a pair of locking members 45 and 46 are secured over the foot portions of the members 39 and 41 to retain them in engagement with the locking ribs 44 whereby the plates 39 and 41 are secured to the axle 24 and move therewith. Fig. 2 also shows that the axially directed foot sections of the plates 37 through 43 extend towards the adjacent plate, with such sections being abutted against each other so as to compensate for the reduced axial thickness of the radially inner sections of the rubber rings. Of course, the rubber rings 33 through 36 are all vulcanized or otherwise bonded to the plates in contact therewith whereby torsional forces applied to the metal face plates will be transmitted to and carried by the associated rubber rings. Plates 39 and 41 and end caps 22 are secured to the axle 24 and rotate therewith while plates 37 and 38, and 42 and 43 are secured, as hereinafter explained, to the housing 21 so that the rubber connecting rings are torsionally stressed on relative arcuate movement of the housing and suspension beams, as occasioned by kinetic load on the support.

In order to secure certain of the plates to the housing, the radially outer surfaces of the face members 37, 38, 42, and 43 are provided with a plurality of serrations or notches 50 and a plurality of circumferentially spaced lips or fixed pawls are formed in the housing 21 by cutting or separating roughly U-shaped sections of the housing and pressing them inwardly of the housing from its outer surface so as to form stops 150 that engage with the notches 50. The stops 150 are, of course, provided in the proper positions axially of the housing 21. Dimples 151 are pressed into the housing to limit the axial inward movement of the face plates 37, 38, 42, and 43 when telescoping them into engagement with the axle 24. Hence such plates are secured to and will not move in the arcuate direction of load application with relation to the housing 21, while the end caps 22 and the plates 39 and 41 are fixedly secured to and move with the axle 24. Thus relative rotational or torsional forces set up between the support member 12, and the axle 24 and its associated suspension arms 14 will be absorbed in the rubber rings 33 through 36 by relative rotational movement between the plates secured to opposite lateral surfaces thereof.

The suspension arms 14 are shown as being secured to the axle 24 by nuts 48 that engage with threaded end sections 148 in the bore of the axle 24 and which force the suspension arms 14, flanges 23, and end caps 22 axially inwardly of the axle. Such action compresses the individual torsion members of the torsion unit 11 and sets up any desired no-load compression therein whereby the load support characteristics of the unit can be varied. By moving the face plates 37 and 38, and 42 and 43 arcuately with relation to the face plates 39 and 41 when telescoping them into the housing, a desired predetermined torsion may be impressed upon the individual torsion units so as to adapt them to stand appreciable static load and to function satisfactorily when subjected to impact loads. Thus adjustment of the preloading of the torsion unit will control its load characteristics and one unit could be adjusted so as to support any of a number of different sizes of planes or other vehicles in a satisfactory manner. To aid in retaining the arms 14 in engagement with the torsion unit 11, aligned holes are formed in the recessed portions of the end caps and suspension arms 14 so that a screw 52 and lock nut 53, Fig. 4, can be engaged with the recess 27 and suspension arm to hold the end cap and suspension arm together. A lock washer may be received underneath the head of the screw 52 to aid in retaining it in engagement with the suspension beam 14.

Another feature of the invention is that an axially inwardly extending lug 61 is formed on each of the end caps 22 and these lugs 61 are adapted to bear upon plates 62 secured to the outer surfaces of the housing 21 by screws 63 so that the lugs 61 of the suspension arms will bear against the lug 61, as best shown in Fig. 5, and limit the arcuate movement between the suspension arms and the housing 21.

From the foregoing, it will be seen that a suspension unit is provided which resists distortion by kinetic load applied to it by both the torsional resistance of a plurality of rubber members and the frictional resistance set up by the friction material 29. Due to the adjustable pre-load which may be applied to the torsion unit of the invention, only a small number of types of torsion units need be supplied to adapt the units for support of any of a wide variety of supported members. It should be noted that there are a minimum of wearable parts in the suspension unit of the invention, that only a minimum of maintenance is required, and that an effective, reliable wheel support unit is provided by the invention, and the objects thereof are realized.

While one complete embodiment of the invention has been illustrated and described in detail herein, the invention is not limited to the specific example set forth, since modification may be resorted to within the scope of the appended claims.

What is claimed is:

1. In a torsionally sprung wheel suspension, a wheel support, a cylindrical housing mounted on said support, an axle mounted for rotation within said housing, a plurality of rubber rings mounted within said housing about said axle, a pair of metal face plates secured to opposite faces of each of said rings, means for compressing said rubber rings axially of said housing, means for securing one of each of said pairs of face plates to said axle for movement therewith, each of the other of said face plates having notches formed in its radially outer surface, stop means on said housing extending into the bore thereof for engaging the said notches to position the notched face plates against arcuate movement in one direction, said housing also having limit means associated therewith for limiting axial movement of said notched face plates into said housing, an arm mounted on said axle, and a wheel mounted on said arm and adapted to deflect the latter to place the rubber rings under a changing shear stress as a kinetic load is applied to said wheel.

2. In a torsionally sprung wheel suspension, a wheel support, a cylindrical housing mounted on said support, an axle mounted for rotation within said housing, a plurality of rubber rings mounted within said housing about said axle, a pair of metal face plates secured to opposite lateral faces of each of said rings, means for compressing said rubber rings axially of said housing, means for securing one of each of said pairs of face plates to said axle for arcuate movement therewith, each of the other of said face plates having notches formed in its periphery, stop means on said housing extending into the bore thereof for engaging the said notches to position the notched face plates against arcuate movement in one direction, an arm mounted on said axle, and a wheel mounted on said arm and adapted to deflect the latter to place the rubber rings under shear stress as a load is applied to said wheel.

3. In a torsionally sprung wheel suspension, a wheel support, a housing mounted on said support, an axle mounted for rotation within said housing, a plurality of rubber rings positioned within said housing about said axle, a pair of metal face plates secured to opposite lateral faces of each of said rings, means for securing one of each of said pairs of face plates to said axle for movement therewith, each of the other of said face plates having notches formed in its radially outer surface, stop means on said housing extending into the bore thereof for engaging the said notches to position the notched face plates and said axle against arcuate movement in one direction, an arm mounted on said axle, and a wheel mounted on said arm and adapted to deflect the latter to place the rubber rings under shear stress as a load is applied to said wheel to change the normal position of said arm and said axle with relation to said housing.

4. A suspension as in claim 3 wherein the axially outer face plates serve as end caps and have flanged edge sections that overlap the housing for a portion of its length, and friction material is secured to said edge sections and bears on said housing to aid in resisting relative movement therebetween.

5. A suspension as in claim 3 wherein the axially outer face plates serve as end caps and have axially inwardly directed flanged edge sections that overlap said housing in closely spaced association, and bearing means are positioned between said housing and edge sections for transmittal of compression load therebetween.

6. An aircraft undercarriage including a housing, a torsion unit disposed therein, said unit comprising a pair of annular rubber torsion members and a pair of metal plates secured to opposite faces of each rubber member, one of the metal plates of each torsion member being secured to said housing, an axle within said housing, the other metal plate of each torsion member being secured to said axle, means comprising a nut in threaded relation with said axle for prestressing said rubber members in axial compression, means comprising pawls depending radially inwardly from said housing and notches formed in the outer periphery of some of said metal plates for prestressing said rubber members torsionally, the axially outer of said metal plates being secured to said axle and constituting end bearings on said housing, the axially outer of said metal plates being provided with laterally directed peripheral flanges forming tubular bearing members encompassing the ends of said housing, and friction material secured to the inner surface of said flanges and bearing on the outer surface of said housing to aid in resisting arcuate movement between said axle and said housing.

7. An aircraft undercarriage including a torsion unit, comprising a tubular housing, a plurality of torsion members each of which comprises an annular rubber member and a pair of metal plates secured to opposite faces of the rubber member, one of the metal plates of each of said torsion members being secured to said housing, an axle for said housing, the other metal plate of each of said torsion members being secured to said axle, the axially outer of said metal plates forming ends for said housing but being secured to said axle, the axially outer of said metal plates being provided with inwardly turned edges that form tubular sections encompassing the end sections of said housing, and bearing material secured between the tubular sections of the axially outer of said metal discs and the outer surface of said housing to carry compression load therebetween.

8. An aircraft undercarriage comprising a tubular housing adapted to be secured to an aircraft support member, a plurality of torsion members each of which comprises an annular rubber member and a pair of metal plates secured to opposite faces of the rubber member, one of the metal plates of each of said torsion members being secured to said housing, an axle within said housing for attachment to a ground contact member, the other metal plate of each of said torsion members being secured to said axle, the axially outer of said metal plates forming ends for said housing but being secured to said axle, the axially outer of said metal plates being provided with inwardly turned edges that encompass the end sections of said housing, and friction material secured to the axially outer of said metal plates and bearing on the outer surface of said housing to aid in resisting arcuate movement between said axle and said housing.

9. In a vehicle suspension, a tubular housing, a plurality of torsion members each of which comprises an annular rubber member and a pair of metal plates secured to opposite faces of the rubber member, one of the metal plates of each of said torsion members being secured to said housing, an axle for said housing with end plates secured thereto, a pair of suspension arms secured to said end plates, said axle having splines formed thereon adjacent each end and in the middle thereof, the other metal plate of each of said torsion members being secured to said axle with certain of such plates engaging said splines for axial movement on but arcuate movement with said axle, and nut means engaging with said axle and said suspension arms for compressing in an axial direction said rubber members whereby the load support characteristics of the suspension may be varied.

10. An aircraft undercarriage including a housing, a torsion unit disposed therein, said unit comprising a pair of annular rubber torsion members and a pair of metal plates secured to opposite faces of each rubber member, one of the metal plates of each torsion member being secured to said housing, an axle within said housing, the other metal plate of each torsion member being secured to said axle, means comprising a nut in threaded relation with said axle for prestressing said rubber members in axial compression, means comprising pawls depending radially inwardly from the wall of said housing and notches formed in the outer periphery of some of said metal plates for prestressing said rubber members torsionally, the axially outer of said metal plates being secured to said axle and constituting radial bearings on said housing, a pair of spaced arms secured to said axle for angular movement therewith, and a wheel mounted on the free end of said arms.

11. In a vehicle wheel suspension, a vehicle wheel support comprising a cylindrical housing, an axle, wheel supporting arms affixed to said axle for rotation therewith, a wheel carried on such arms in trailing relation to said vehicle support, a series of rubber torsional discs mounted in said housing about said axle, and a pair of end plates bonded to the lateral faces of each disc, one plate of each pair being interlocked with said housing and the other plate of each pair being interlocked with said axle so that the rubber discs are placed in shear stress as the wheel supporting beams are deflected upon application of loads from said vehicle support to said wheel, the end plates adjacent the ends of said housing being secured to said axle and having flanges surrounding the ends of said cylindrical housing to afford bearings for supporting said axle for rotational movement within said housing.

12. In a torsional sprung wheel suspension, a wheel support, a cylindrical housing mounted on said support, an axle mounted for rotation in said housing, a plurality of rubber rings mounted within said housing about said axle, means including a nut in threaded relation with the end of said axle for subjecting the rubber rings to any desired no-load compression whereby the load support characteristics of the suspension can be varied, means for impressing upon the individual rubber rings a desired predetermined torsion comprising metal face plates secured to said rings, some of said plates having notches formed in the peripheries thereof and stop means on said housing extending into the bore thereof for engaging said notches, splines on the outer surface of said axle adapted to receive therebetween the radial inner edges of the other of said plates in non-rotatable relation therewith, whereby said rubber rings may be adapted to support appreciable static and impact load.

ROY W. BROWN

REFERENCES CITED

The following references are of record in the file of this patent:

UNITED STATES PATENTS

| Number | Name | Date |
|---|---|---|
| 2,002,377 | Mayne | May 21, 1935 |
| 2,092,613 | Olley | Sept. 7, 1937 |
| 2,206,901 | Klotsch | July 9, 1940 |
| 2,231,037 | Taylor | Feb. 11, 1941 |
| 2,354,428 | Saurer | July 25, 1944 |

FOREIGN PATENTS

| Number | Country | Date |
|---|---|---|
| 47,160 | France | Nov. 7, 1936 |
| | (2nd Addition to No. 793,615) | |
| 209,879 | Great Britain | Jan. 24, 1924 |
| 363,039 | Great Britain | Dec. 17, 1931 |
| 521,258 | Great Britain | May 16, 1940 |